Patented Feb. 14, 1933

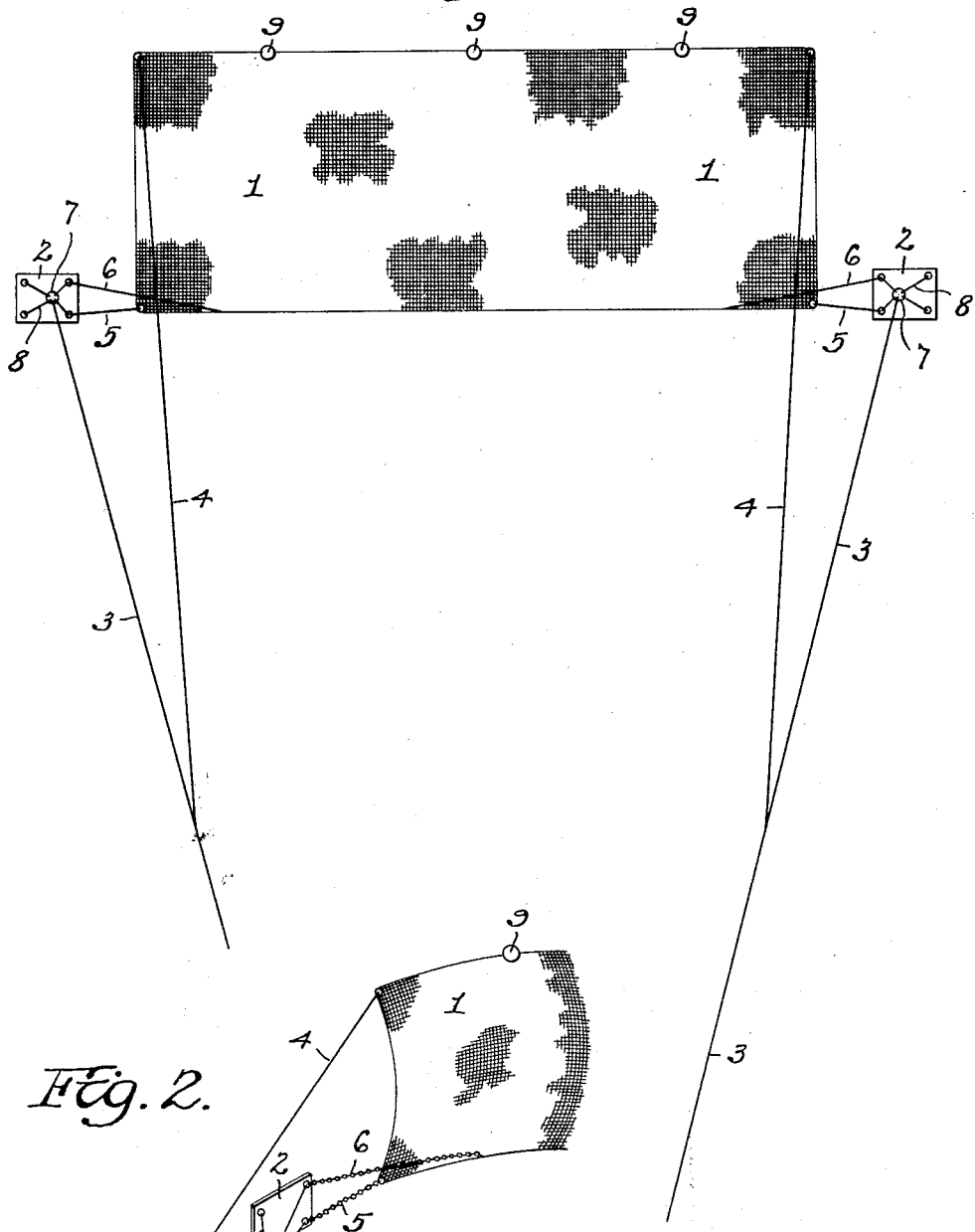

1,897,147

UNITED STATES PATENT OFFICE

ALTON J. ROWE, OF WELLS BEACH, MAINE, ASSIGNOR OF ONE-FOURTH TO FRED F. BOYCE, OF PORTLAND, MAINE, AND ONE-FOURTH TO WILLIS B. HALL, OF CAPE ELIZABETH, MAINE

NET FOR TRAWLERS

Application filed October 6, 1930. Serial No. 486,819.

This invention relates to nets for trawlers, the general object of the invention being to provide means whereby the net can be adjusted any desired distance from the bottom so that it will not drag on the bottom, thus avoiding the catching of useless fish which are usually at the bottom of the sea, the destroying of the feeding grounds of the fish and spawning beds, and the invention also enables the use of the net on stony ground where nets dragging along the bottom cannot be used. The invention also enables the net to be adjusted at a level where the fish are running.

Another object of the invention is to eliminate the heavy weights now used with trawler nets so that the use of a powerful, expensive equipment on the trawler for handling the net is unnecessary.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a front view of the invention.

Figure 2 is a transverse sectional view through Figure 1.

In these views, the numeral 1 indicates the net and the numeral 2 the doors to which the tow lines 3 are connected, the tow lines also being connected with the upper corners of the net by the lines 4. As shown, the doors are of very small size and each door is connected to the net by a cable 5 which extends from a lower corner of the net to the inner lower corner of the door and the cable 6 which extends from the inner upper corner of the door to the bottom of the net a distance from the end thereof. Each line 3 is connected to a ring 7 which is connected by the cables 8 to the corners of the door, the inner cables being shorter than the outer cables, as shown in Figures 1 and 2.

Floats 9, such as glass balls, are connected with the upper edge of the net and whenever necessary or desirable, weights may be connected with the lower edge thereof, particularly if it is desired to have the net drag the bottom or slightly above the bottom.

The cables 5, 6 and 8 should be adjustable as to their length, as should also the lines of cable 4, this adjustment being accomplished in various ways by providing hooks and the like where the cables are formed of chains or using different lengths of ropes when the cables are formed of ropes.

By making the inner cables 8 shorter than the outer ones, when the boat starts to pull the doors, the outside edges of the doors swing toward the boat and the net bags rearwardly, as shown in Figure 2. By attaching the doors to the bottom of the net by the lines or cables 5 and 6, the bottom edge of the net is raised from the floor of the sea so that it will not drag along the floor and by adjusting the length of these lines and the length of the lines 4, the net can be adjusted at any desired level to position the net where the fish are running. As before stated, if it is desired to have the net drag on the bottom, weights can be attached to the lower edge of the net.

Thus it will be seen that I have provided means whereby the position of the net relative to the floor of the sea can be regulated and the parts are so arranged and constructed that the equipment for handling the same from the boat is far less expensive and takes far less power to manipulate it than with the nets now in use.

It will be understood that any form of net can be used with the invention.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

The combination with a trawler net, of a door beyond each end thereof, a series of cables connected with the corners of each door, certain of the cables being shorter than the remaining cables, a ring common to and connected with the series of cables and disposed offset relative to the center of said door, a line connecting the lower innermost corner of each door with a lower corner of the net, a line connecting the upper innermost corner of each door with the bottom of the net at a considerable distance from its end, and a tow line connected with each ring and having a branch removed a distance from the connection of the tow line with the ring and engaged with the upper portion of the net.

In testimony whereof I affix my signature.

ALTON J. ROWE.